Sept. 16, 1941.    V. J. BOOR ET AL    2,256,337
PORTABLE SOUND AND PICTURE REPRODUCING APPARATUS
Filed March 9, 1940    7 Sheets-Sheet 1
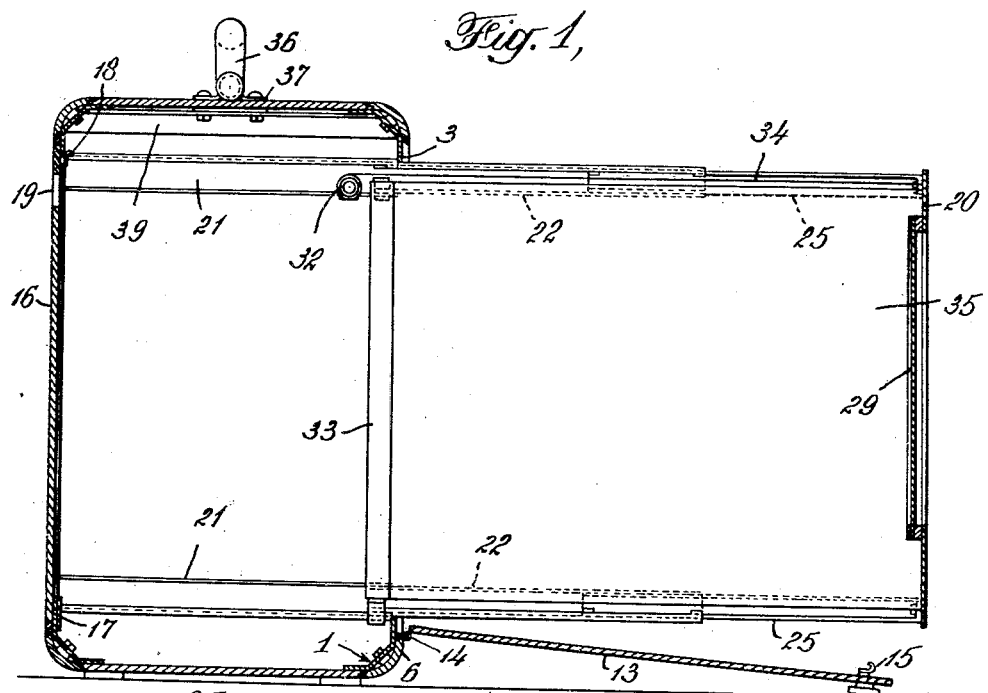
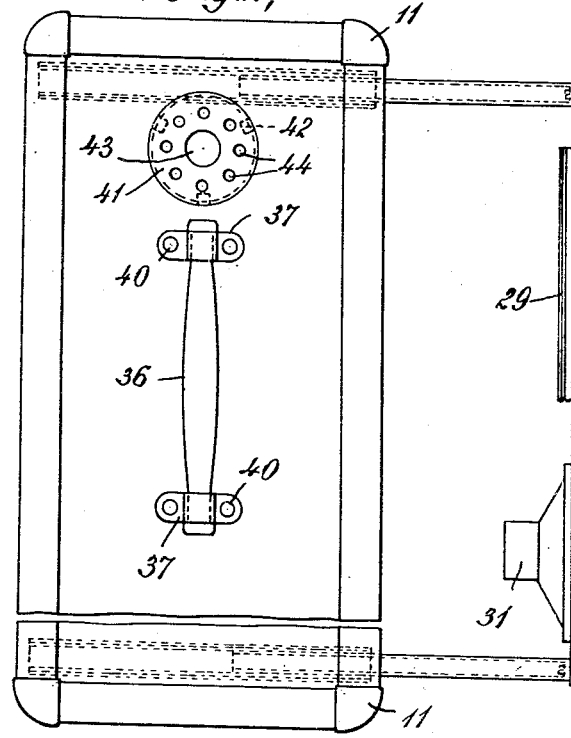
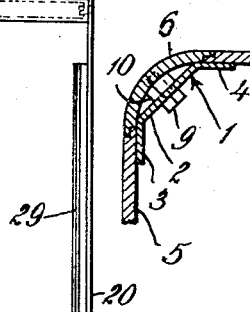
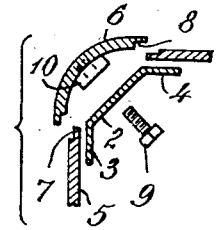
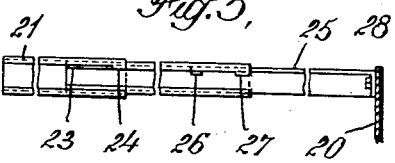
INVENTORS
Vladimir J. Boor
Arthur J. Bradford
BY
Pennie, Davis, Marvin & Edmonds
ATTORNEYS

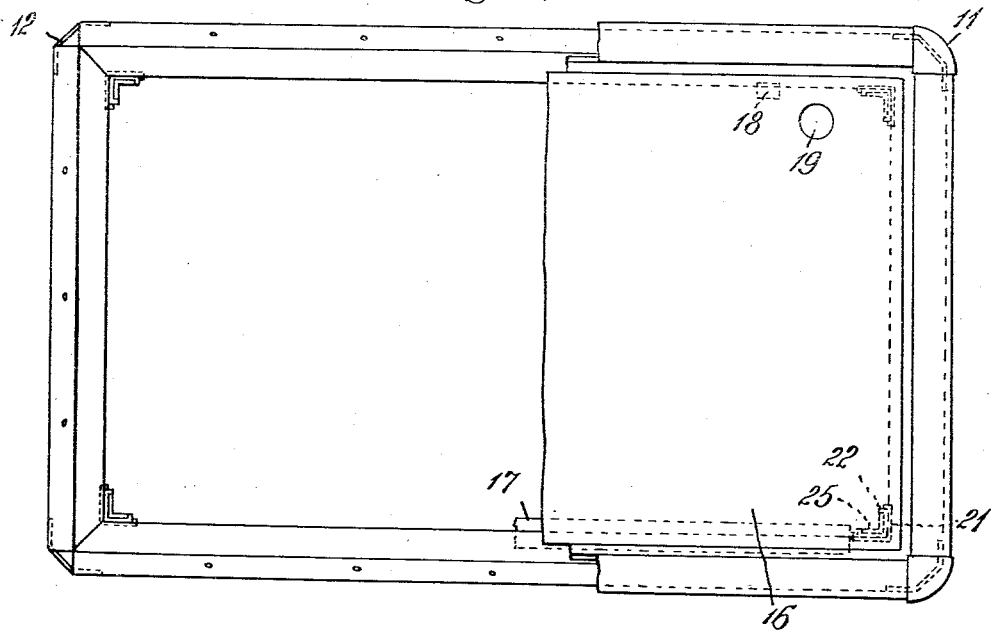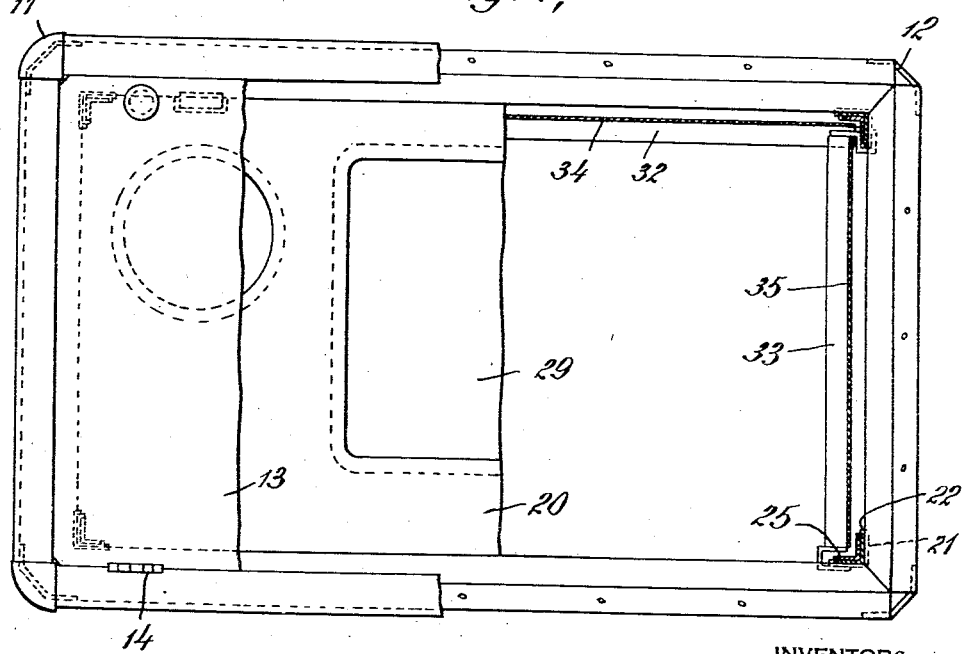

Sept. 16, 1941.   V. J. BOOR ET AL   2,256,337
PORTABLE SOUND AND PICTURE REPRODUCING APPARATUS
Filed March 9, 1940   7 Sheets-Sheet 3

INVENTORS
Vladimir J. Boor
Arthur J. Bradford
BY
Pennie, Davis, Marvin & Edmonds
ATTORNEYS

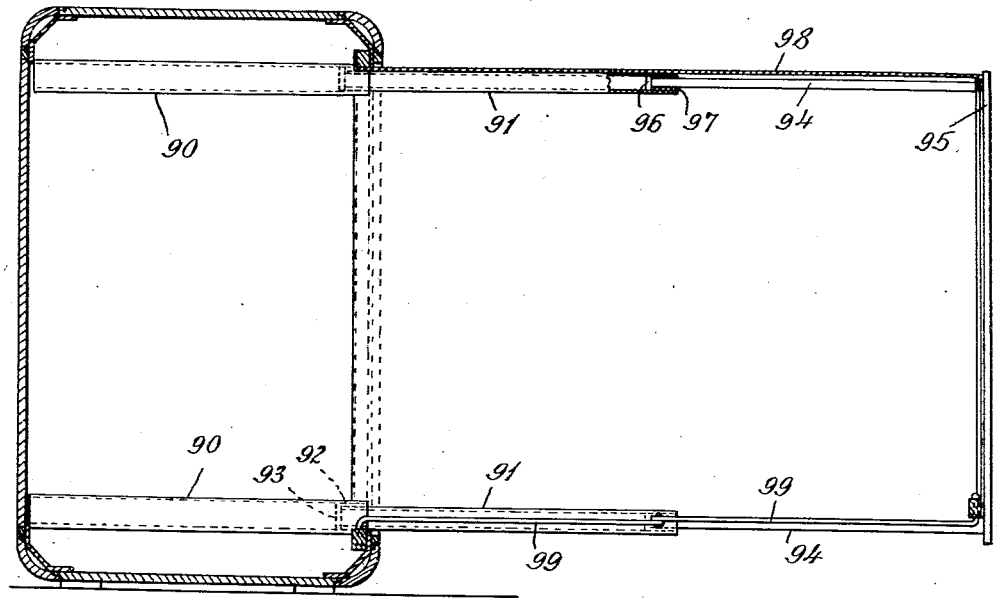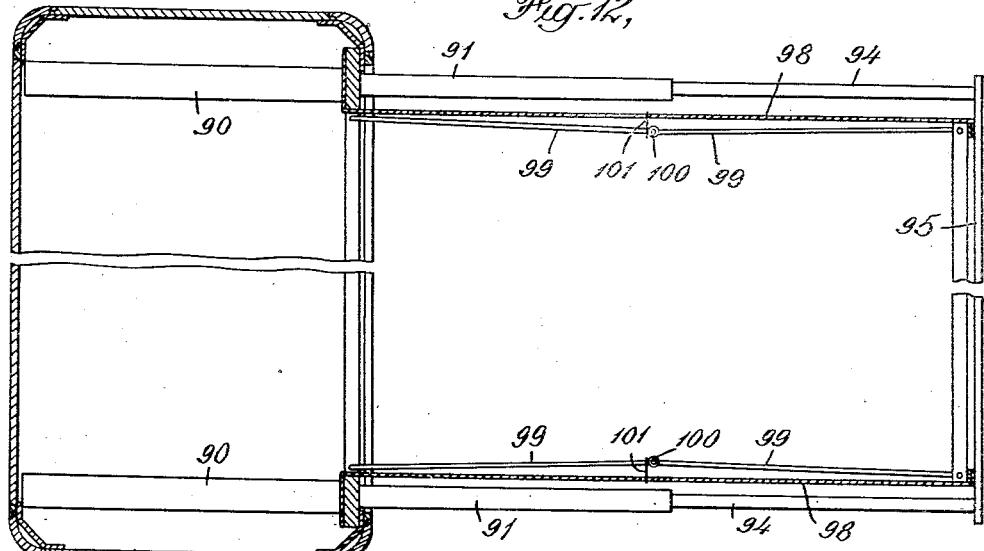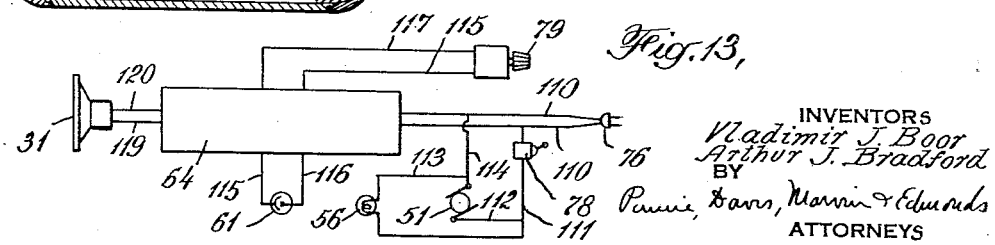

Sept. 16, 1941.   V. J. BOOR ET AL   2,256,337
PORTABLE SOUND AND PICTURE REPRODUCING APPARATUS
Filed March 9, 1940   7 Sheets-Sheet 5
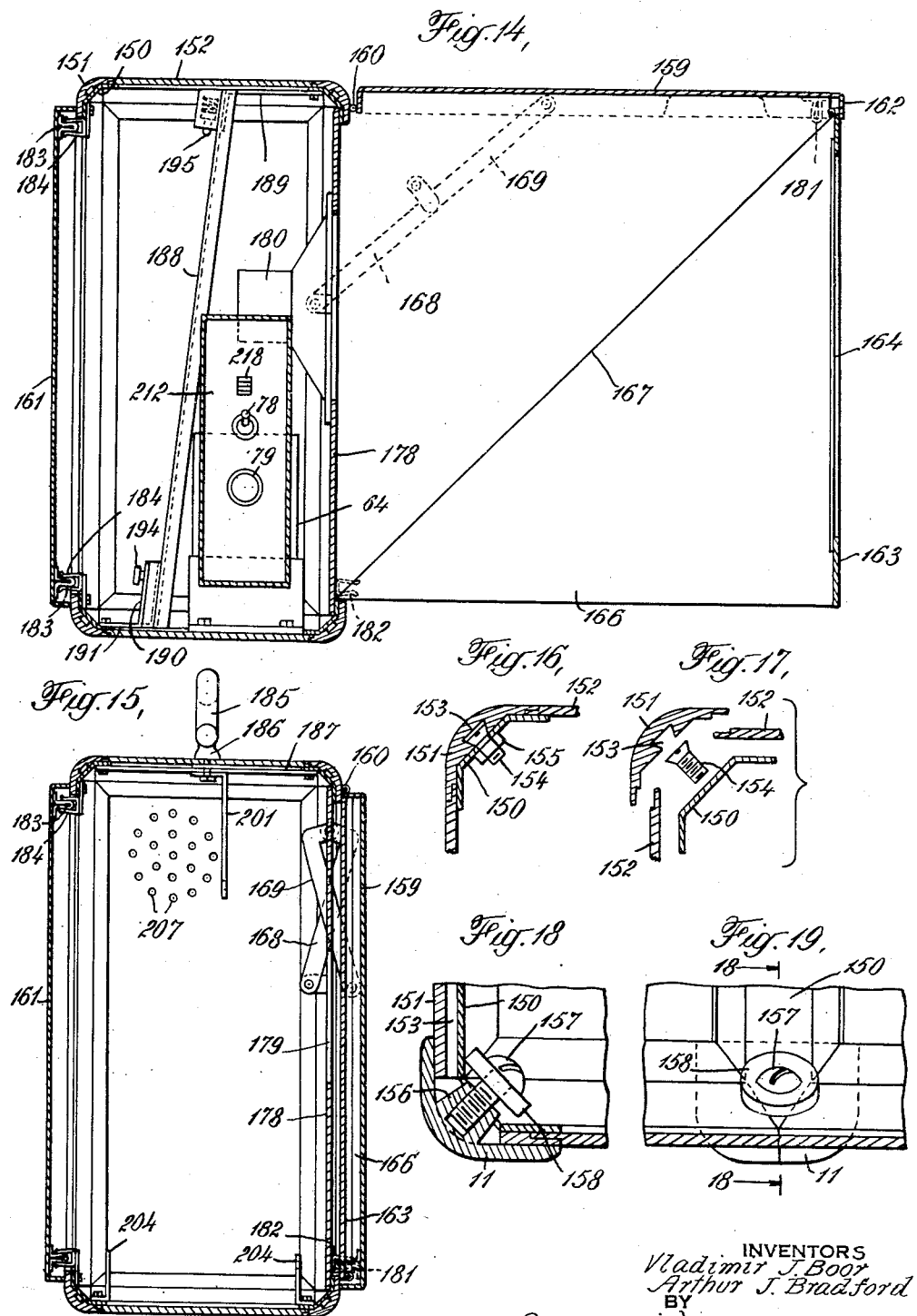
INVENTORS
Vladimir J. Boor
Arthur J. Bradford
BY
Pennie, Davis, Marvin & Edmonds
ATTORNEYS

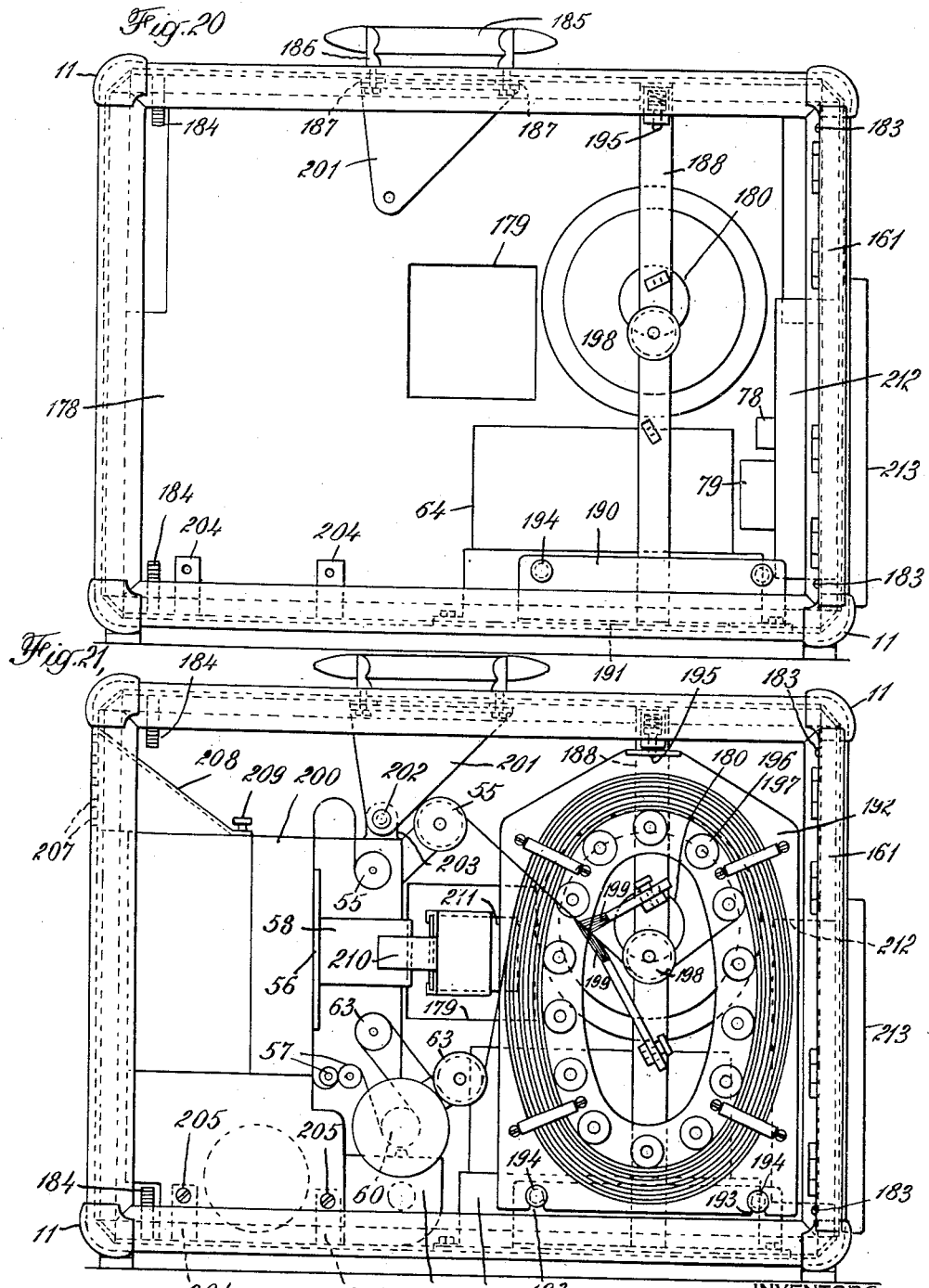

Sept. 16, 1941.  V. J. BOOR ET AL  2,256,337
PORTABLE SOUND AND PICTURE REPRODUCING APPARATUS
Filed March 9, 1940  7 Sheets-Sheet 7
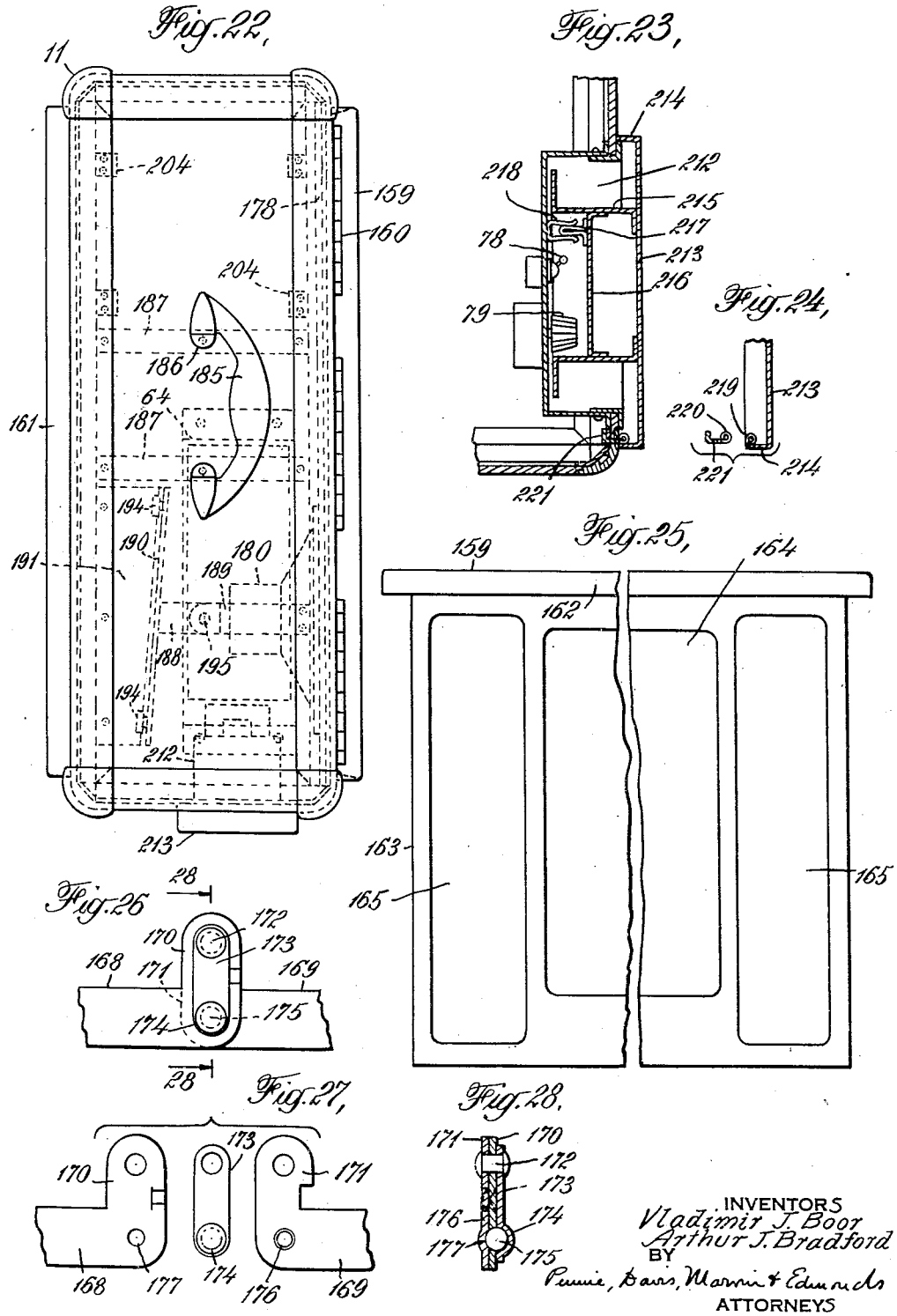
INVENTORS
Vladimir J. Boor
Arthur J. Bradford
BY
Pennie, Davis, Marvin & Edmonds
ATTORNEYS Patented Sept. 16, 1941

2,256,337

UNITED STATES PATENT OFFICE 2,256,337

PORTABLE SOUND AND PICTURE REPRODUCING APPARATUS

Vladimir J. Boor, Scotch Plains, N. J., and Arthur J. Bradford, Grosse Pointe Farms, Mich., assignors to Jam Handy Picture Service, Inc., Detroit, Mich., a corporation of Delaware Application March 9, 1940, Serial No. 323,158

11 Claims. (Cl. 88—16.2)

This invention relates to portable sound and picture reproducing apparatus and more particularly to an apparatus of such character that can be mounted in a case which may be readily transported from place to place and which is capable of use by merely plugging it into an ordinary light socket or convenient outlet.

A portable sound and picture reproducing apparatus is in considerable demand at the present time for sales and educational purposes and for entertainment, and several types of apparatus of this character have been devised. The apparatus heretofore proposed is open to one of several objections. In some of the apparatus proposed, some of the units, such as the screen or the projector, are merely carried in the case and must be independently set up when the apparatus is to be used. Other apparatus which has been suggested is too heavy to be readily conveyed by hand and must be mounted on rollers or casters to be moved from place to place.

In the present invention we provide a case of a size comparable to that of an ordinary suit case or hand bag in which all of the parts of the apparatus is mounted. On one of the sides of greatest area, which may be called the front of the case, we provide a support for the screen and loud speaker and this support is carried by telescoping or collapsible arms so that it can be arranged entirely within the case when the apparatus is not in use or in an extended position when in operation.

An important feature of the invention is the provision of a case which, while strong enough to carry the various units of the apparatus, is of light weight so that the overall weight of the case containing the apparatus is such that it may be carried by hand from place to place. For this purpose we provide a case consisting of a skeleton frame of which the parts are preferably welded to each other and the sides, ends, top and bottom of the case are formed of panels which are retained in position by molding strips suitably secured to the frame.

In the accompanying drawings we have shown several embodiments of the invention. In this showing:

Fig. 1 is a vertical, sectional view of the case showing the screen in open position with the projector, amplifying unit and other parts removed for better illustration of the case construction;

Fig. 2 is a plan view of the case showing the screen in a partly closed position;

Fig. 3 is a detailed, sectional view of one edge of the case;

Fig. 4 is a detailed view of the parts shown in Fig. 3 showing the parts disassembled;

Fig. 5 is a detailed view of one of the arms which supports the screen and loud speaker members;

Fig. 6 is a rear elevation of the case, parts being broken away;

Fig. 7 is a front elevation of the case, parts being broken away and shown in section;

Fig. 11 is a vertical, sectional view similar to Fig. 1 showing a slightly different construction of case and supporting arms for the screen and loud speaker;

Fig. 12 is a horizontal, sectional view of the parts shown in Fig. 11;

Fig. 13 is a diagrammatic illustration of the wiring arrangement.

Fig. 14 is a vertical, sectional view of another form of the invention showing the screen in extended position;

Fig. 15 is a similar view with the parts in closed position;

Fig. 16 is a detailed, sectional view of an edge of the case showing a modified construction;

Fig. 17 is a similar view showing the parts disassembled;

Fig. 18 is a sectional view of a corner of the case;

Fig. 19 is an inside elevation at right angles to Fig. 18, parts being shown in section;

Fig. 20 is a rear view of the case with the back opened and with the projector and film reel removed;

Fig. 21 is a similar view with the projector and film reel in position;

Fig. 22 is a plan view of the case;

Fig. 23 is a detailed, sectional view of a portion of one of the end walls of the case;

Fig. 24 is a sectional view of a detail of Fig. 23 on an enlarged scale;

Fig. 25 is a front elevation of the screen;

Fig. 26 is a detailed view of a supporting arm of the front cover;

Fig. 27 is a similar view showing the parts separated; and

Fig. 28 is a detailed, sectional view on line 28—28 of Fig. 26.

Figure 8:
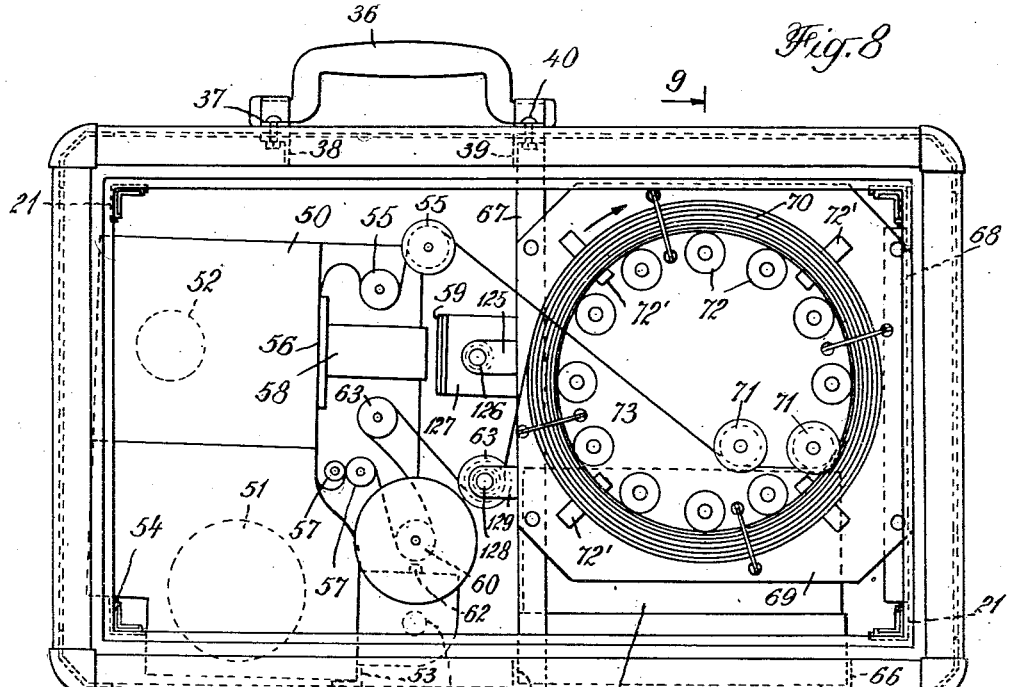
Fig. 8 is a rear elevation with the projecting mechanism and amplifying unit in the case.

Referring to Figs. 1 to 7 of the drawings in which we have shown the case with the apparatus removed, except the extensible panel which supports the screen and loud speaker, the construction shown in these views, while devised for the purpose of providing a light case sufficiently strong to carry the assemblage of apparatus employed in a portable picture and sound reproducer, is also capable of use in the construction of various kinds of portable cases, such as travelling bags and the like. In constructing the case we first provide a suitable frame formed of angle members 1 which are secured to each other to form the bounding edges of the sides, front, back, top and bottom and ends of the case. These angle members are secured to each other in any suitable manner, preferably by welding. As shown in detail in Figs. 3 and 4 of the drawings, each of the angle members consists of a central portion or web 2 having end portions 3 and 4 arranged at an obtuse angle to the web 2 and at right angles to each other. The end portions 3 and 4 are arranged at right angles to each other so that one of them will form a portion of one wall, such as a side, and the other form a portion of an adjacent intersecting wall at right angles thereto, such as a top or end. The space of each wall between the angle members forming the frame is filled by means of a panel 5 which may be a sheet of laminated Bakelite or other suitable composition. These panels are secured to the frame by means of molding strips 6 arranged on the outside of the frame. As shown the edges of the panels are provided with notches 7 adapted to cooperate with similar notches 8 on the edges of the molding strips so that when the units are assembled as shown in Fig. 3, the panels are held in position. The molding strips may be secured to the frame by means of bolts 9 which pass through openings in the webs 2 and are received in tapped openings formed in bosses 10 which are welded or otherwise secured to the inner face of the molding strip. The molding strips are preferably curved in cross section as shown to produce a bag having a pleasing exterior appearance. Suitable clamping devices 11 are secured to the molding strips at each of the corners of the bag and these clamping devices are secured in position by means hereinafter described.

The front of the case is provided with a hinged panel or closure 13 which is hinged to the lower molding strip 6. A suitable spring catch 15 is mounted on the upper free edge of the hinged cover 13 and engages the web 3 of the top frame member when the cover is closed as shown in Fig. 7.

The rear of the case is normally closed by a removable panel 16, the lower edge of which is notched to interlock with the lower molding strip as shown at 17 in Fig. 1 of the drawings. The upper edge of the panel 16 is provided with spring clips 18 (see Fig. 1) which engage the web 3 of the upper frame member when the panel is in position. The panel may be provided with one or more finger openings 19 or other suitable means to permit its removal and to permit access to the interior of the case.

As stated an extensible panel is mounted in the front of the case and is adapted to support a screen and loud speaker. The panel 20 is shown in extended position in Fig. 1 of the drawings and in partially extended position in Fig. 2 of the drawings and in closed position in Fig. 7 of the drawings. When the panel 20 is in closed position, the hinged cover or panel 13 may be closed as shown in Fig. 7 of the drawings and the device carried from place to place. Panel 20 is supported on a plurality of telescoping arms, one form of which is shown in Figs. 1 to 7. In this form the supporting arms are right angular members and one of such arms 21 is secured in each of the four corners of the case extending from front to back as shown in Fig. 1 and supported by the frame, the arms 21 being preferably welded to the frame members 2. An intermediate arm 22 is mounted to slide within the arm 21 and the rear end of the arm 22 is provided with a lug or projection 23 adapted to engage a similar lug or projection 24 on the forward end of the stationary arm 21 to limit the movement of the arm 22 (see Fig. 5). Likewise an arm 25 is carried by and is slidable within each of the arms 22 and is provided with a lug or projection 26 on its rear end cooperating with a similar lug or projection 27 on the forward end of the arm 22. The panel 20 is bolted or otherwise secured to the forward ends of the arms 25 as shown at 28 in Fig. 5 of the drawings. A suitable screen 29 is mounted in an opening in the panel and this screen is arranged slightly in the rear of the plane of the panel which is provided with an opening in alignment with the screen. A loud speaker 31 which may be of any suitable construction is also mounted in the panel to one side of the screen as shown in Fig. 2 of the drawings.

When the panel 20 is in extended position for the reproduction of pictures and the pictures are projected from a projector within the case, to be later described, it is necessary to enclose the space between the front of the case and the panel to prevent entrance of light. For this purpose we provide a spring roller 32 arranged in the case extending horizontally near the top and a pair of similar spring rollers 33 extending vertically at each side. Shades 34 and 35 are carried by the rollers 32 and 35, and the ends of the shades are attached to the rear face of panel 20 so that when the panel is extended, the shades will be unrolled and form a hood covering the sides and the top of the space between the front of the case and the panel to exclude light. By employing spring rollers 32 and 33 the shades are automatically re-rolled when the panel is moved to its inoperative position as shown in Fig. 7 of the drawings. When the shades are extended to form a hood, the angular arms 22 and 25 fill the gap between the upper edges of the side shades and the edges of the top shade to prevent light entering the space beneath the hood.

The case may be provided with a suitable handle 36 and the handle is preferably mounted in a pair of straps 37 on the top of the panel of the case. These straps are in turn secured to angle members 38 and 39 arranged on the inside of the case beneath the panel member 5 which forms the wall of the case and which extend transversely of the top of the case as shown in Fig. 8. Angle members 38 and 39 are secured to the side frame members 2 of the top of the case in any suitable manner as by welding and suitable fastening means, such as rivets 40, and extend through the angle members, the top panel of the case and the straps 37. The case is also provided with an opening in the top (see Fig. 2) closed by a plate 41. This plate is provided with clips 42 which frictionally engage the edge of the opening in the case to retain the plate in position and is further provided with an opening 43 which may be used as a finger opening to remove the plate 41. It is further provided with a plurality of ventilator openings 44 for a purpose to be described.

Figures 9, 10:
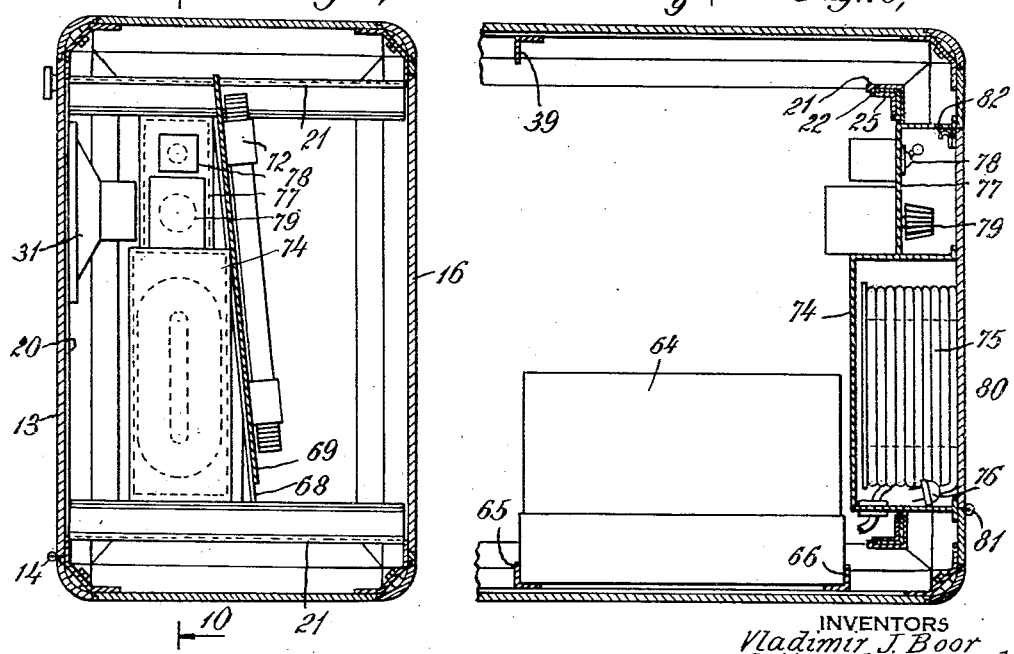
Fig. 9 is a vertical, sectional view on line 9—9 of Fig. 8.
Fig. 10 is a detailed, sectional view on line 10—10 of Fig. 9.

Referring particularly to Figs. 8 to 10 of the drawings wherein we have shown the arrangement of the projector, sound reproducing apparatus, amplifying unit and reel for supporting the film, the projector, sound reproducing apparatus and amplifying unit may be of conventional construction, but the parts are assembled for compactness and to produce a unitary apparatus in a single case which is of such weight that it can be readily conveyed from place to place. Thus as shown in Fig. 8 we provide a projector 50 which is arranged transversely of the case, that is, its axis of projection is parallel to the plane of the screen 29. The projector may be of any suitable type but is preferably an apparatus provided with a motor which operates on either alternating or direct current. The motor 51 is mounted in the base of the projector and the projection lamp 52 is mounted in the projector in the usual manner but is in alignment with the opening in the top of the case closed by the plate 41 so that access may be obtained to it for replacing a burned out lamp. The openings 44 in this plate also serve as a ventilating means for dissipating the heat generated by the projection lamp. As shown the projector is supported on an angle iron 53 which extends transversely of the case and is welded or otherwise secured to the bottom frame members of the case and adjacent the rear of the projector as at 54 it is supported upon one of the arms 21. The projector is provided with the usual film guide rolls or sprockets 55 arranged above the film gate 56 and with similar guide rolls 57 arranged beneath it whereby the film may be fed past the film gate to project the pictures through a lens mounted in a lens tube 58 in the usual manner. Adjacent the outer end of the lens tube we provide a mirror 59 arranged at a suitable angle to project the light beam forwardly at right angles to the plane of the screen. From the lower guide rolls 57 the film passes over a guide roll 60 which is arranged over a sound reproducing unit 61. The sound reproducing unit is of conventional structure and a detailed description thereof is deemed unnecessary. It is provided with the usual aperture 62 in alignment with the sound track of the film. From the roll 60 the film passes over other suitable rolls 63 and is returned to a film reel to be described. The currents produced in the unit 61 are transmitted to an amplifying unit 64 where they are amplified and converted to audible frequencies and caused to actuate the loud speaker 31. The amplifying unit is arranged toward the side of the case opposite from the projector and toward the front of the case. It is supported on a pair of angle irons 65 and 66 which are welded or otherwise secured to the bottom frame members. An angle iron 67 extends from the top to bottom of the case adjacent the center and is secured to the angle irons 39 and 65, respectively. The angle iron 67 is arranged at a slight angle to the front and rear walls of the case and cooperates with a second angle iron 68 arranged at one end of the case and secured to the adjacent arms 21. A plate 69 (see Figs. 8 and 9) is secured to these angle irons and forms the support for the film reel. As shown the film is in the form of an endless reel 70 and is fed to the projector from the inside of the reel over suitable guide rolls 71 and thence to the upper guide rolls or sprockets 55 of the projector. After the film has passed the projecting machine and the sound reproducing unit 61 and passed over the last guide roll 63, it returns to the outside of the endless reel as shown in Fig. 8. The arrangement of the plate 69 at a slight angle is for the purpose of disposing the returning film and the film being fed in different vertical planes where they pass each other. The reel is formed of a plurality of rollers 72 and 72' and is held in place on the rollers by means of spring clips 73.

In the end of the case adjacent the film reel and amplifying unit we provide a compartment 74 having a reel therein which supports a connector cord 75 having a plug 76 on its outer end and above the compartment 74 we provide a second compartment 77 in which is mounted a switch 78 which controls the supply of current to the motor 51 and the lamp 52 of the projector. The compartment 77 also houses a volume control member 79 of the amplifying unit 64. These two compartments are preferably closed by a single door 80 which is hinged to the case as at 81 and is provided with a spring clip 82 which normally holds it in closed position.

In Figs. 11 and 12 of the drawings we have shown a slightly simplified construction of the extensible screen and its associated parts. The construction of the case per se is substantially as heretofore described, but in place of the telescoping angle irons 21, 22 and 25 for supporting the screen we provide a series of tubular members. As shown tubular members 90 are mounted in the case near each corner and these tubular members receive intermediate tubular members 91 of slightly less diameter. The outer ends of the tubular members 90 are provided with collars or inserts 92 adapted to be engaged by a plate or disc 93 on the inner ends of the tubular members 91 to limit the outward movement of the tubular members 91. A second set of movable tubular arms 94 likewise telescope in the intermediate tubular arms 91 and a panel 95 is secured to the outer ends of these arms. The outward movement of the arms 94 is limited in a manner similar to that heretofore described in connection with the arms 91 by means of plates or discs 96 on the inner ends of these arms which engage collars 97 formed on the outer ends of the arms 91. In this form of the invention in place of the shade rollers 32 and 33 and the shades 34 and 35 we provide a collapsible fabric shield or shutter 98 which extends over the sides and top of the space between the front of the case and the panel 95 when the panel is in extended position. The sides are adapted to fold inwardly when the panel is in closed position and to assure this result we provide a pair of arms 99 on each side of the panel unit at the bottom which arms are hinged to the back of the panel and the frame, respectively, and have their adjacent ends hinged to each other as at 100 (see Fig. 12). These arms, when the panel is in extended position, are bowed slightly inwardly as shown in Fig. 12 so that when the panel is moved toward its closed position, the arms fold toward the center of the case. The fabric 98 is secured to these arms at intervals as indicated at 101 so that it is folded inwardly with the arms. In the form of the invention shown in Figs. 11 and 12 we dispense with the hinged cover or closure 13 and provide a suitable removable plate to fit into the panel 95 to cover the speaker and screen when the device is in closed position.

In Fig. 13 we have diagrammatically illustrated the various circuits. As shown, plug 76 is connected to a pair of lead wires 110 and 111 which are represented by the connector cord 75 and one of these lead wires is connected to switch 78. The opposite side of the switch is connected to motor 51 and lamp 52 by wires 111 and 112 and from the opposite sides of the motor 51 and the lamp 52 lead wires 113 and 114 lead to the other side of the input circuit. The input circuit is in turn connected to the amplifying unit 64 and the sound reproducing unit 61 is connected to the amplifying unit by wires 115 and 116. The volume control 79 is connected to the amplifying unit by wires 117 and 118 and the loud speaker 31 is connected to the amplifying unit by wires 119 and 120.

The mirror 59 is preferably adjustably mounted and for this purpose it may be carried by a bracket 125 which is provided with a ball and socket joint 126 to receive a plate 127 on which the mirror is carried. Likewise the guide roll 63 from which the film returns to the film reel may be adjustably mounted in a ball and socket joint 128 carried by a bracket 129. Brackets 125 and 129 are mounted on angle iron 67.

In Figs. 14 to 28 of the drawings we have illustrated another form of the invention, certain details of which may also be used in conjunction with the forms heretofore described. In the construction herein illustrated we have made certain modifications whereby the over-all size of the apparatus is reduced. The case is constructed substantially as heretofore described and consists of a frame formed of angle members 150, molding strips 151 and panels 152. Instead of securing the molding strips to the frame in the manner shown in Figs. 3 and 4 of the drawings, we may employ an extruded molding strip having a groove 153 therein adapted to receive the head of a bolt or screw 154. These bolts are passed through suitable openings in the angle member 150 arranged at desired intervals and the parts secured together by nuts 155 arranged on the inside of the case. The corner structure shown in Figs. 18 and 19 is used in the various forms of the invention wherein the corner piece 11 heretofore described is provided with a boss 156 on the inside which is bored and adapted to receive a screw 157. This screw carries a washer 158 which engages the adjacent angle members of the frame and secures the corner piece in position.

As shown in Figs. 14, 15 and 22, the case is substantially rectangular in vertical and horizontal cross section and is provided with a front door 159 hinged to the frame at its upper edge as indicated at 160 and a rear door 161 hinged to one side of the frame and adapted to swing in a vertical plane. The front door 159 is provided with a flange 162 on all sides and a screen support 163 is pivotally mounted on the lower edge of the door so that when the door is in the raised position shown in Fig. 14 of the drawings, the screen support assumes a vertical position spaced from the front of the casing. The central portion of the support 163 receives a screen 164 (see Fig. 25) and at each side thereof the support is provided with openings in which a sound pervious fabric member 165 is placed. For the purpose of excluding light from the rear of the screen or in other words forming a hood in conjunction with the cover member 159 we provide a pair of fabric sheets 166, one on each side. When in the extended position shown in Fig. 14 of the drawings, these sheets form the sides of the hood and they are creased diagonally as indicated at 167 to permit them to fold inwardly between the screen support 163 and the cover 159 when the cover is closed.

The parts are retained in the position shown in Fig. 14 of the drawings by means of a pair of arms. Each of these arms comprises a section 168 which is pivoted to the front frame member at each side and a second arm 169 pivoted to the side flange 162 of the cover. These arms are connected to each other and are provided with locking means to retain them in open position as shown in Figs. 26 to 28 of the drawings. As shown the ends of the arms 168 and 169 are provided with angular extensions 170 and 171 and these extensions are further provided with aligned openings for the reception of a pivot pin 172. A plate 173 is arranged on the pivot and this plate is provided with a substantially semi-spherical portion 174. Ball 175 is arranged therein and, when the arms are in open position, a portion of the ball passes through an opening 176 in one of the arms and is received in a depression 177 in the other arm to retain them locked in open position. Within the front of the case we provide a partition 178 which partition is provided with an opening 179 (see Fig. 20) for the passage of light whereby the picture to be projected is thrown on the screen 164. A loud speaker 180 is also mounted on this partition. The cover 159 is provided with members 181 near its free edge which cooperate with clips or fingers 182 to form a catch to retain the cover in closed position. The fingers 182 are carried by the lower frame member. The free edge of the rear cover 161 is likewise provided with catches 183 adapted to be received by spring fingers 184 when this cover is closed. The fingers 184 are carried by the side frame member.

As in the form of the invention heretofore described the case is provided with a suitable handle 185 and this handle is mounted in a pair of supports 186 on the top of the case. These supports extend through the top opening and are secured to cross members 187 which are carried by the top frame members as shown in Fig. 22 of the drawings.

In place of the plates 69 shown in Fig. 8 of the drawings for supporting the film reel we employ a removable film reel supported on a member 188 which extends from the top to the bottom of the casing at a slight angle as shown in Fig. 14. The upper end of the member 188 is supported by an arm or strap 189 arranged on the inside of the top of the casing and secured to the front top frame member and the lower end is secured to a substantially vertical portion 190 of a plate arranged at the bottom of the casing. The plate is also provided with a horizontal portion 191 extending across the bottom of the casing and secured to the lower rear frame member as shown in Figs. 14 and 22. As shown the vertical portion 190 of this plate is also at an angle to the rear wall of the casing. A film holder 192 is detachably secured to the members 188 and 190. As shown the lower edge of the film holder is provided with notches 193 which are received by headed pins 194 and the upper edge of the film holder 192 is adapted to be received behind a spring catch 195 carried adjacent the upper end of the member 188. In the form of the invention herein shown, for the purpose of decreasing the over all dimensions of the case, the film reel is oval as shown in Fig. 21 of the drawings and consists of a plurality of rollers 196 which may be formed of plastic material and which are preferably mounted on roller bearings. As heretofore described the roll of film 197 is arranged around these rolls and in feeding the film to the projector it passes from one of the rolls 196 at the inside of the film roll over a guide wheel or roller 198 which is carried by the member 188. The member 188 also forms a support for a pair of brushes 199 which are adapted to lightly engage the film as it is fed past them.

A projector 200 generally similar to the projector 50 shown in Fig. 8 of the drawings is arranged in the casing as shown in Fig. 21 of the drawings. As heretofore described the projector is arranged transversely of the case with its axis of projection parallel to the plane of the screen 164. The projector is supported in a slightly different manner from that heretofore described. Transverse members 187 on the inside of the top of the case support a plate 201 which is bolted or riveted to these members and the lower end of this plate receives a bolt 202 which passes through an opening in an ear 203 carried on the top of the projector. At the bottom a pair of supporting members 204 are secured to each of the lower frame members and the projector casing is bolted to these supporting members as at 205. In lieu of the opening in the top of the casing shown in Fig. 2 of the drawings we provide a plurality of openings 207. These openings 207 serve as ventilating openings. Within the casing an inclined plate 208 is bolted to the top of the projector as at 209 and extends toward the openings 207 to permit ventilation of the lamp (not shown) in the top of the projector. By moving the plate 208 access may be obtained to the top of the projector for replacement of a burned out lamp. The projector is provided with a motor as heretofore described in connection with the form of the invention shown in Fig. 8 and is likewise provided with the film feed sprockets 55, film gate 56, lens tube 58 and guide rolls 57 arranged beneath the film gate. The apparatus is also provided with the sound reproducing unit 61 heretofore described and the associated guide rolls 60 and 63. As shown in Fig. 21 of the drawings a mirror support 210 is mounted on the side of the lens tube, the outer end of which is arranged at an angle of substantially 45° to the lens tube and carries a mirror 211 which is adapted to project the rays of light through the aperture 179 on to the screen 164. The apparatus is likewise provided with an amplifying unit 64 similar to that heretofore described and arranged in the bottom of the casing as shown.

In lieu of the compartments 74 and 77 shown in Fig. 10 of the drawings we may arrange the control mechanism and the connector cord in a single compartment as shown in Fig. 23. As here shown we provide a compartment 212 closed by a door 213 which is provided with a peripheral flange 214 similar to the door flanges heretofore described. On the inside of the door we provide a support 215 about which the connector cord (not shown) is adapted to be coiled and within the support 215 we provide a plate 216 carrying an arm or finger 217 adapted to cooperate with a spring catch 218 on the inner wall of the compartment to retain the door in closed position. The volume control member 79 of the amplifying unit and the switch 78 which controls the supply of current to the projector motor are arranged in the compartment 212. The flange of door 213 is provided with one section 219 of a hinge which may be formed integral therewith by stamping and this section cooperates with a section 220 of a hinge carried by a plate 221 which is secured to the adjacent lower frame member. The doors 159 and 161 may have one section of the hinge formed integral therewith in a similar manner.

In either of the forms of the invention, when the screen and loud speaker supporting panel 20, 95 or 163 is in closed position illustrated in Figs. 7 and 15 of the drawings, the entire apparatus is contained in the case and may be carried by hand from place to place. As stated the case construction provides sufficient strength to support the various units therein but is also light enough that the over-all weight of the assemblage is such that it may be readily conveyed by hand. When the apparatus is to be used, it is merely necessary to move the panel to the extended position shown in Figs. 1, 11, 12 and 14, unreel the connector cord 75 and insert the plug in a convenience outlet. As stated, projector motor 51 is capable of operating on either alternating or direct current and the amplifying unit 64 is also capable of operating on either alternating or direct current at voltages between 95 and 120 volts.

We claim:

1. A portable sound and picture reproducing apparatus comprising a case, a projector arranged within the case with its axis at right angles to the front of the case, a sound reproducing unit arranged adjacent the projector, means for feeding film to the projector and the sound reproducing unit, an amplifying unit mounted in the case, a panel extending over substantially the entire front of the case, collapsible arms secured to the panel and to the case whereby the panel may be arranged within the case or in an extended position spaced therefrom, a loud speaker carried by the panel and connected to the amplifying unit, a screen on the panel, and means for directing light rays from the projector to the screen.

2. Apparatus in accordance with claim 1 wherein the panel is supported by telescoping arms having sections mounted in the case and sections movable into and out of the first sections, the panel being secured to the last sections of the telescoping arms.

3. Apparatus in accordance with claim 1 wherein a collapsible hood is provided to cover the top and sides of the space between the panel and the case when the panel is in extended position.

4. A portable sound and picture reproducing apparatus comprising a case, means within the case for projecting pictures and reproducing sound, a panel extending over substantially the entire front of the case, collapsible arms secured to the panel and the case whereby the panel may be arranged within the case or in an extended position spaced therefrom, shade rollers mounted in the case and shades carried by said shade rollers having their ends secured to the inner face of the panel so that when the panel is extended the shades will be unwound from the rollers and form a shield around the space between the panel and the front of the case.

5. A portable sound and picture reproducing apparatus comprising a case, said case including a frame, means for projecting pictures and reproducing sound mounted in the case, a panel extending over substantially the entire front of the case, means for supporting the panel in position in the case or in an extended position spaced from the case, said means comprising telescoping arms arranged in the case adjacent each corner and having sections secured to the adjacent frame members and telescoping sections within the first sections, with the panel secured to the second sections of the telescoping arms, and a hood covering the space between the panel and the case when the panel is in extended position.

6. A portable sound and picture reproducing apparatus comprising a case, said case including a frame, means for projecting pictures and reproducing sound mounted in the case, a panel extending over substantially the entire front of the case, means for supporting the panel in position in the case or in an extended position spaced from the case, said means comprising angle irons arranged adjacent each corner of the case and secured to the frame and angle irons of smaller cross section telescopically mounted therein, a panel being secured to said second mentioned angle irons, and a hood covering the space between the panel and the case when the panel is in extended position.

7. A portable sound and picture reproducing apparatus comprising a case, said case including a frame, means for projecting pictures and reproducing sound mounted in the case, a panel extending over substantially the entire front of the case, means for supporting the panel in position in the case or in an extended position spaced from the case, said means comprising telescoping tubular arms arranged in the case adjacent each corner and having sections secured to the adjacent frame members and sections telescoping therein with the panel secured to the movable sections, and a hood covering the space between the panel and the case when the panel is in extended position.

8. A portable sound and picture reproducing apparatus comprising a case, said case including a frame, means for projecting pictures and reproducing sound mounted in the case, a panel extending over substantially the entire front of the case, means for supporting the panel in position in the case or in an extended position spaced from the case, said means comprising telescoping arms arranged in the case adjacent each corner and having sections secured to the adjacent frame members and sections telescoping therein with the panel secured to the outer sections, a plurality of shade rollers mounted near the front of the case, and shades carried on said rollers and secured to the panel to form a hood between the panel and the front of the case when the panel is in extended position.

9. A portable sound and picture reproducing apparatus comprising a case, said case including a frame, means for projecting pictures and reproducing sound mounted in the case, a panel extending over substantially the entire front of the case, means for supporting the panel in position in the case or in an extended position spaced from the case, said means comprising telescoping arms arranged in the case adjacent each corner and having sections secured to the adjacent frame members, and movable sections telescoped therein with the panel secured to the movable sections, a hood formed of fabric covering the space between the front of the case and the panel when the panel is in extended position and a pair of hinged arms connected to the panel adjacent each side and to the case and foldable toward the center of the front of the case, the hood being secured to said arms.

10. A portable sound and picture reproducing apparatus comprising a case, a projector rigidly mounted within the case adjacent one side with its axis extending longitudinally thereof, a sound reproducing unit arranged adjacent the projector, means for feeding film to the projector and sound reproducing unit, an amplifying unit in the case operatively connected to the sound reproducing unit, a panel mounted in the front of the case, extensible means connecting the panel to the case whereby the panel may be moved to an extended position spaced from the case, a loud speaker mounted in the case and connected to the amplifying unit, a screen carried on the panel, means for directing light rays from the projector to the screen.

11. A portable sound and picture reproducing apparatus comprising a case, a projector rigidly mounted within the case arranged adjacent one side of the case with its axis extending at right angles to the front of the case, a sound reproducing unit arranged adjacent the projector, means for feeding film to the projector and the sound reproducing unit, an amplifying unit in the case operatively connected to the sound reproducing unit, a door hinged to the top edge of the front of the case, a screen support hinged to the free edge of the door and adapted to be arranged in a vertical plane spaced from the case when the door is in open position, a screen carried by the screen support, a loud speaker mounted in the case and connected to the amplifying unit, and means for directing light rays from the projector to the screen.

VLADIMIR J. BOOR.
ARTHUR J. BRADFORD.